July 15, 1947.  H. W. O'CONNOR  2,423,848
SPACER RING
Filed May 15, 1945

INVENTOR.
Harry W. O'Connor
BY
Ralph L Chappell
ATTORNEY.

UNITED STATES PATENT OFFICE 2,423,848

SPACER RING

Harry W. O'Connor, New York, N. Y.

Application May 15, 1945, Serial No. 593,908

1 Claim. (Cl. 113—111)

(Granted under the act of March 3, 1883, as amended April 30, 1928; 370 O. G. 757)

This invention relates to a flexible spacer ring, useful in maintaining alignment and spacing between adjacent surfaces of annular objects while work is being done upon them, as, for example, in welding lengths of pipe to other pipe, fittings, flanges and the like.

In many installations, such as high pressure equipment, clearances are specified between the ends of sections of pipe and the surfaces they abut, such as the ends of other sections of pipe, or the shoulders of flanges. The problem of maintaining a specified clearance between annular objects to be welded is often complicated by the expansion of the parts during welding. The use of gaskets to maintain the desired clearance is wasteful of material, time and labor. Often they can not be removed until the assembly has thoroughly cooled, and their removal is always slow and difficult, since they must be cut or scraped out.

An object of this invention is to provide a spacer ring for aligning and spacing annular objects while such objects are being welded or otherwise worked upon.

Another object of this invention is to provide a spacer ring as above described which is easily inserted and which will hold its position without external aid.

Still another object of this invention is to provide a spacer ring as above described which may be easily removed while the adjoining annular surfaces remain rigidly fixed with relation to each other.

A further object of this invention is to provide a spacer ring as above described which can absorb compression without permanent deformation, and which will return to its original cross-sectional shape when such compressionl force is removed.

A still further object of this invention is to provide a spacer ring as above described which may be used and reused many times.

Figure 1:
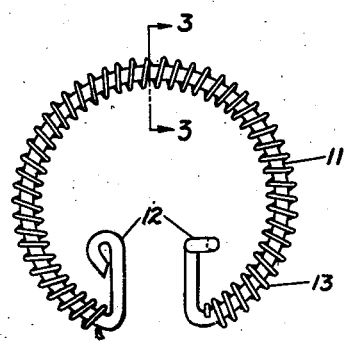
Figure 2:
Figure 3:
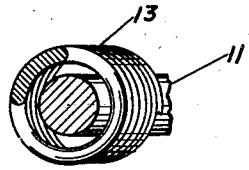

Further objects and advantages of this invention, as well as its construction, arrangement and operation, will be apparent from the following description and claims in connection with the accompanying drawings, in which, Figure 1 is a top plan view of the spacer ring of this invention, Figure 2 is a side elevation of the spacer ring of this invention, looking toward the open end, Figure 3 is a sectional view of the spacer ring of this invention taken along the line 3—3 of Figure 1.

Figure 4:
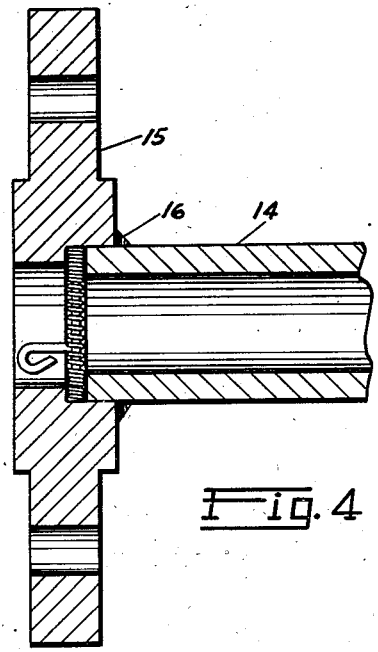
Figure 5:
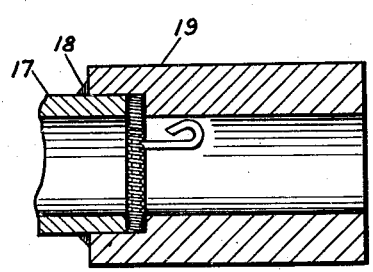
Figure 6:
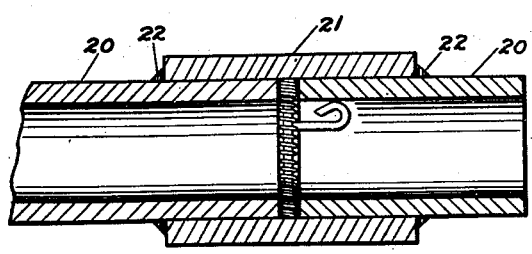

Figure 4 is a section through a length of pipe and a flange welded thereto, with the spacer ring of this invention in place between them, Figure 5 is a section through two lengths of pipe welded together in a fillet welded socket joint, with the spacer ring of this invention in place between them, and Figure 6 is a section through two lengths of pipe and a sleeve, the parts being welded together in a sleeve joint, with the spacer ring of this invention in place between the two lengths of pipe.

Referring to the drawings in detail, 11 represents a split ring of spring wire or equivalent elastic material (Figs. 1, 2, and 3), the ends of which are sharply bent inward, ending in loops or grips 12. Grips 12 may be coplanar with split ring 11, or may extend at an angle from the plane of split ring 11, as desired. Wound about split ring 11 and contained within its ends is a helix 13, also made of spring wire or similar material.

The drawings illustrate several examples of the utilization of the spacer ring of this invention, as between a length of pipe 14 being joined to a flange 15 by weld 16 (Figure 4), between a length of pipe 17 being joined by weld 18 to another length of pipe 19 in a fillet welded socket joint (Figure 5), and between two lengths of pipe 20 being joined together by sleeve 21 and welds 22 in a sleeve joint (Figure 6).

The wire used in making split ring 11 and helix 13 is preferably of circular cross-section. The inner diameter of helix 13 is greater than the diameter of the wire comprising split ring 11, a suitable relationship being established when the diameter of the wire comprising helix 13 is approximately one-fourth the diameter of the wire comprising split ring 11, and the outer diameter of helix 13 is approximately twice the diameter of the wire comprising split ring 11.

In the operation of the invention, a spacer ring of suitable size is selected, that is, a spacer ring in which the diameter of split ring 11 is substantially equal to or slightly larger than the diameter of the recess into which it is to be inserted, and in which the outer diameter of helix 13 is equal to the clearance desired. The spacer ring is then grasped by means of grips 12, the operator using his fingers or a suitable implement such as pair of pliers, or a suitable spanner and the diameter of split ring 11 is reduced by forcing the grips 12 into close proximity. In this contracted condition, the spacer ring is inserted in place, as, for example, against the interior shoulder of flange 15 (Figure 4), against the interior shoulder of pipe 19 (Figure 5), or inside sleeve 21 (Figure 6). When inserted, grips 12 are released and the spacer ring expands and remains held in place by the tendency of split ring 11 to expand still further, to its original diameter.

With the spacer ring in place, the parts to be positioned and worked upon may be brought together, and both of them pressed firmly against the spacer ring. The outer diameter of helix 13 being constant throughout its length, and equal to the clearance desired, the adjacent annular parts will then be not only properly spaced, but also properly aligned and coaxial. The adjacent parts being thus properly spaced and aligned, they may then be tacked or completely welded together, or may be otherwise worked upon. After the work has been completed, the spacer ring may be easily removed by grasping grips 12 with the fingers or a suitable instrument, forcing the grips 12 into close proximity with each other, and withdrawing the spacer ring. The spacer ring is then ready for reuse.

When two annular parts are being welded together with the spacer ring of this invention between them, the heat of welding may cause expansion of the parts resulting in a diminution of the clearance between the two surfaces adjoining the spacer ring. This diminution of clearance exerts compressive force upon the spacer ring, which is totally absorbed by helix 13. It will be apparent that helix 13 may be temporarily distorted to a considerable degree without binding upon split ring 11 and without any permanent distortion resulting in either helix 13 or split ring 11.

The spacer ring may be removed, if desired, while helix 13 is in a compressed, distorted condition, although more force will be required to bring grips 12 together, it being necessary to overcome the friction caused by the adjoining surfaces bearing on helix 13. Upon removal, however, helix 13 will return to its original shape, and no permanent deformation will result from the temporary compressive deformation. Or, alternatively, the spacer ring may be left in place until the adjoining parts have cooled and the original clearance between them has been restored by contraction, whereupon the spacer ring will reassume its original shape in place, and may be readily removed as before.

The grips 12 may be of any shape desired, provided they do not extend beyond the periphery of split ring 11. A most useful combination of shapes has been found to be as illustrated in Figures 1 and 2, with one of grips 12 being coplanar with split ring 11 and extending inward, and the other being coplanar with split ring 11 for a part of its length and then being bent at an angle of 90 degrees so that it is perpendicular to the plane of split ring 11. This combination of shapes makes for easy grasping, and the grip 12 perpendicular to the plane of split ring 11 is a convenient means for handling, inserting or withdrawing the split ring.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A spacer ring for spacing objects during a welding operation, comprising a split ring of spring wire, the said split ring forming almost a complete circle, the ends of said split ring being bent inwardly and formed into grips, and a helix of spring wire encircling said split ring and being contained within its ends, the diameter of the spring wire comprising said helix being smaller than the diameter of the spring wire comprising said split ring, and the inside diameter of said helix being greater than the diameter of the spring wire comprising said split ring.

HARRY W. O'CONNOR.

REFERENCES CITED

The following references are of record in the file of this patent:

UNITED STATES PATENTS

| Number | Name | Date |
| --- | --- | --- |
| 1,310,859 | Eklund | July 22, 1919 |
| 1,069,882 | Kirby, Jr. | Aug. 12, 1913 |
| 2,080,906 | Boyer | May 18, 1937 |
| 2,380,071 | Planett | July 10, 1945 |